(No Model.) 7 Sheets—Sheet 1.
A. BLONDEL & S. PSAROUDAKI.
LAMP GLOBE.
No. 563,836. Patented July 14, 1896.
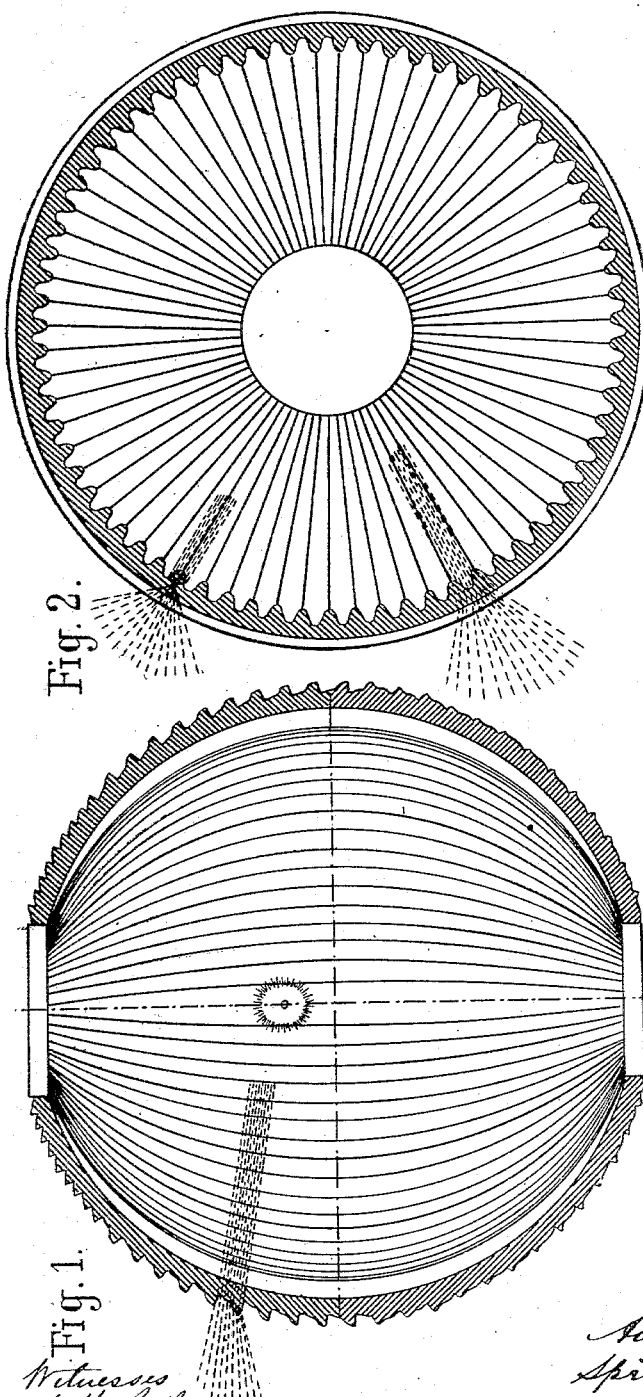
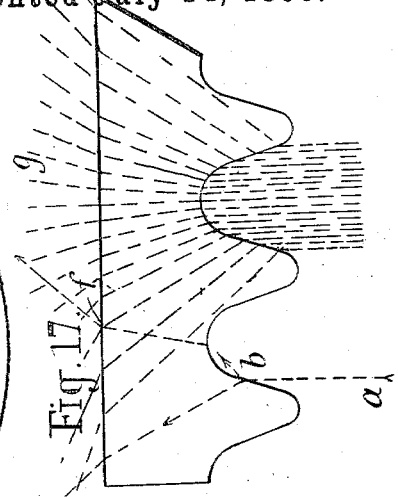
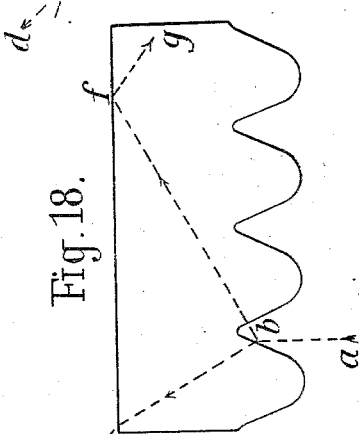
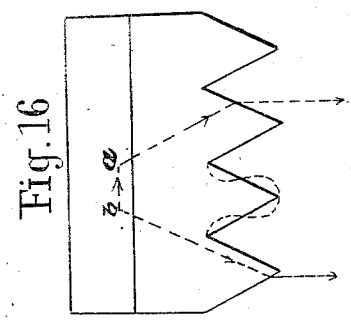
André Blondel and
Spiridion Psaroudaki
Inventors:
by Price Stewart attys
Witnesses (No Model.) 7 Sheets—Sheet 2.
A. BLONDEL & S. PSAROUDAKI.
LAMP GLOBE.
No. 563,836. Patented July 14, 1896.
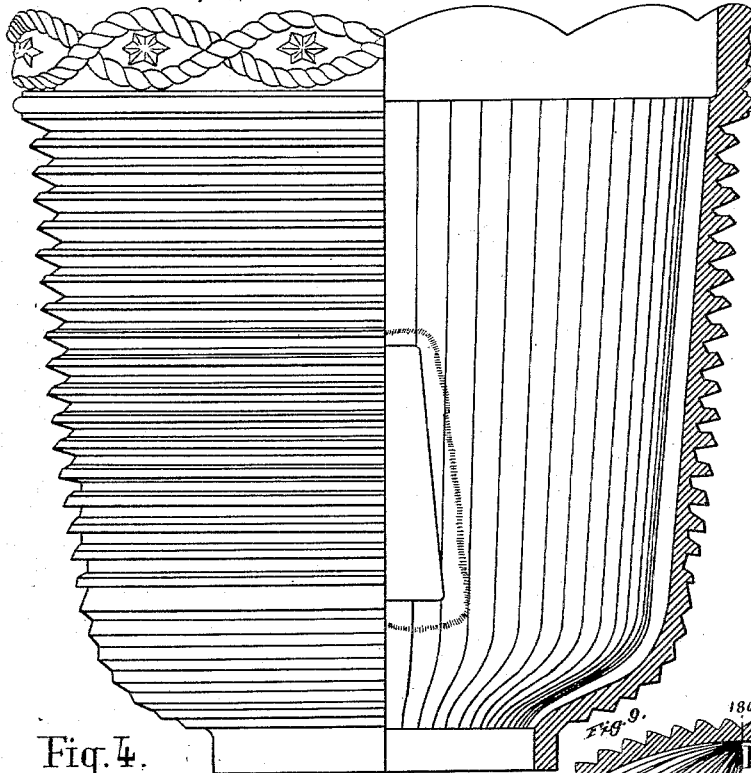
Fig. 4.
Fig. 14.
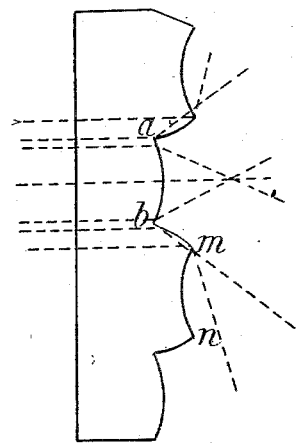
Fig. 15.
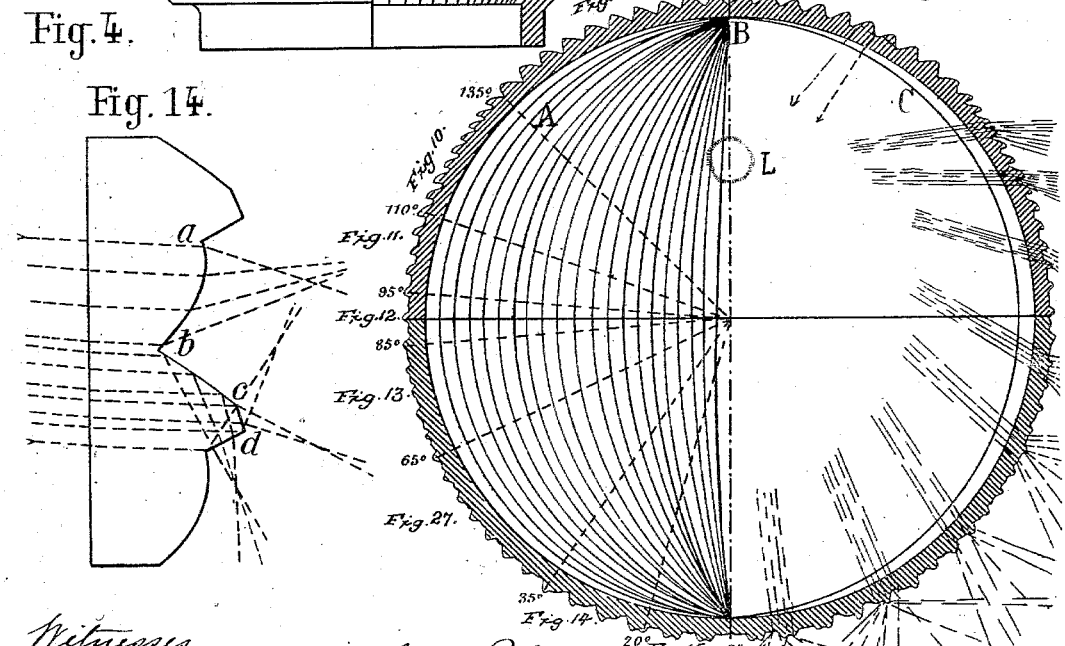
Fig. 3.
Witnesses
H. MacCarthy
M. J. Stewart
André Blondel and
Spiridion Psaroudaki Inventors
by Price & Stewart Attys (No Model.)  7 Sheets—Sheet 3.
A. BLONDEL & S. PSAROUDAKI.
LAMP GLOBE.
No. 563,836.  Patented July 14, 1896.
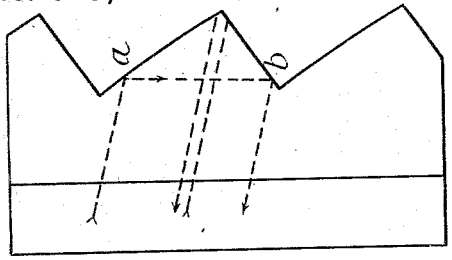
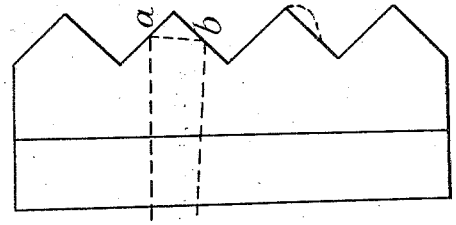
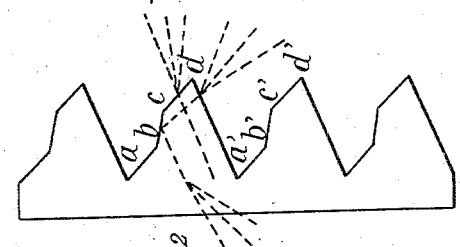
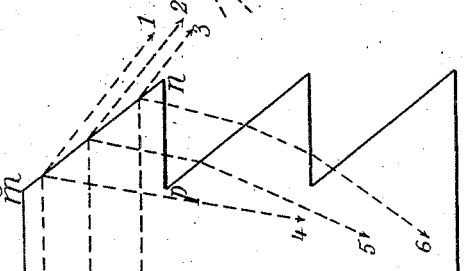
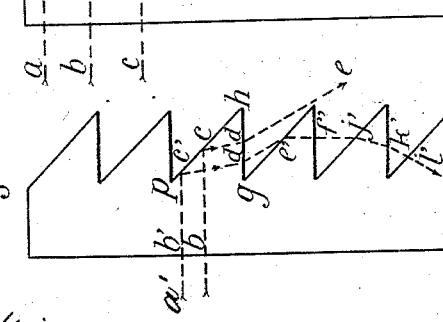
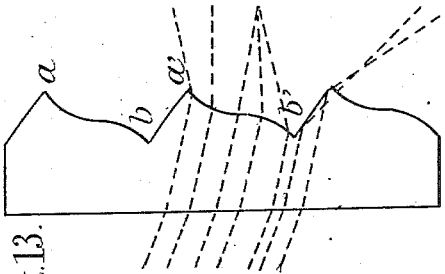
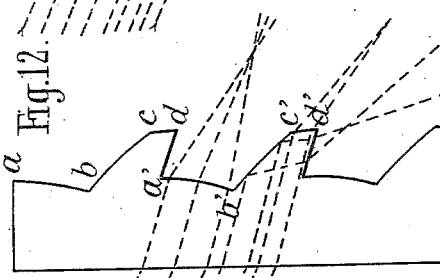
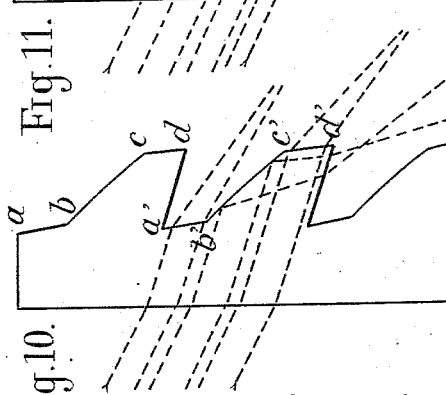
Inventors:
André Blondel and
Spiridion Psaroudaki
by Price Hunt Attys
Witnesses
H. Mac Carthy
M. G. Stewart

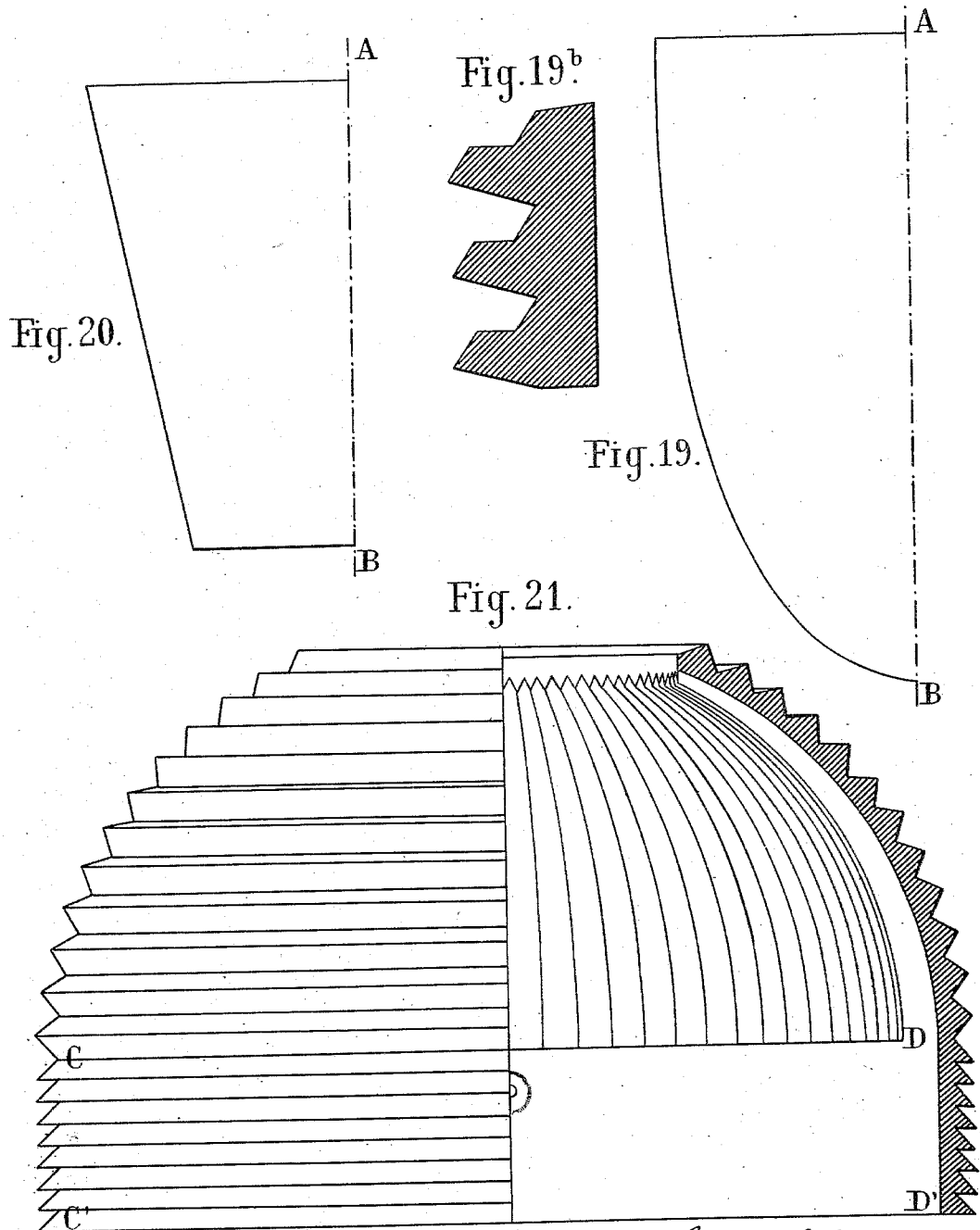

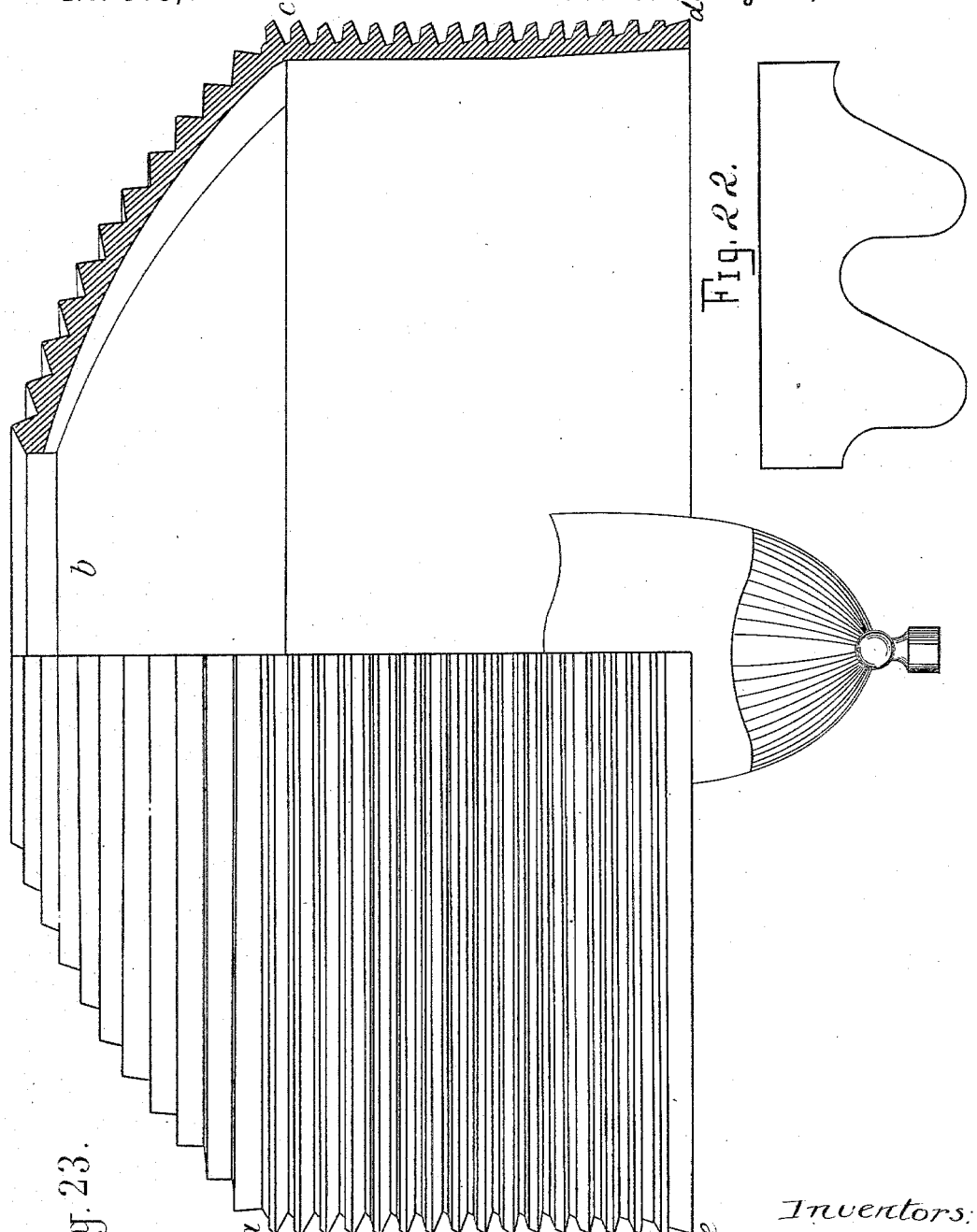

(No Model.) 7 Sheets—Sheet 6.
A. BLONDEL & S. PSAROUDAKI.
LAMP GLOBE.
No. 563,836. Patented July 14, 1896.
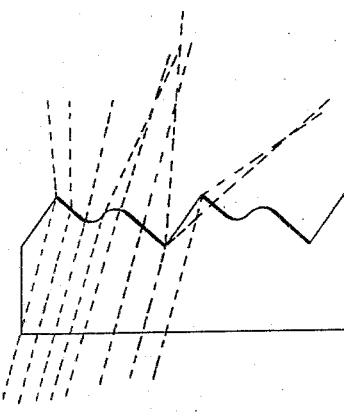
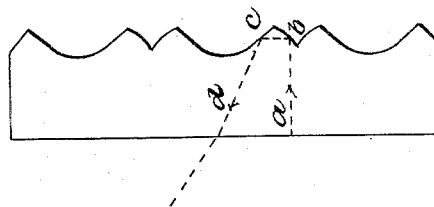
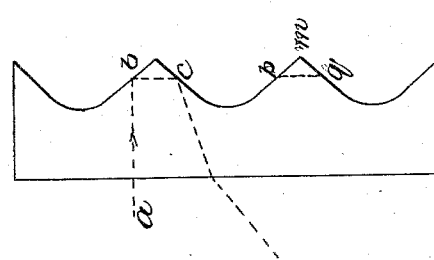
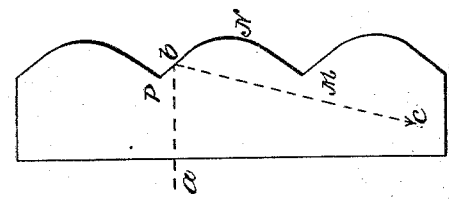
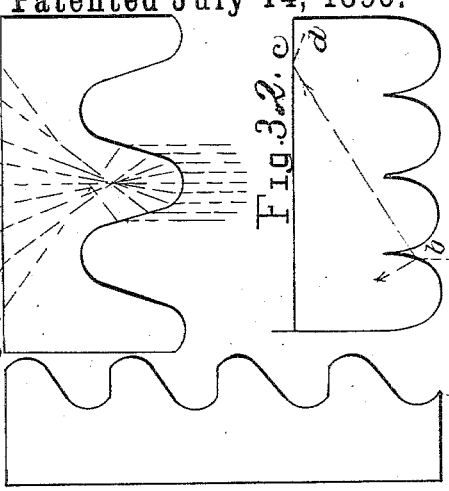
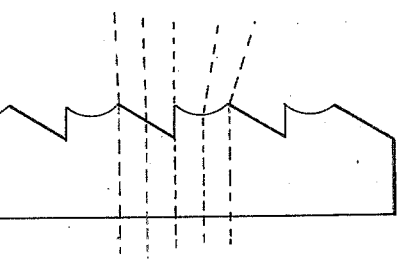
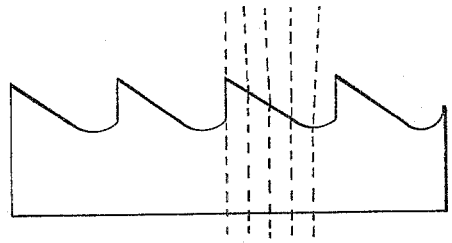
Inventors:
André Blondel and
Spiridion Psaroudaki
WITNESSES:
H. Mac Carthy
M. G. Stewart
BY Price Stewart
ATTORNEYS.

(No Model.) 7 Sheets—Sheet 7.
A. BLONDEL & S. PSAROUDAKI.
LAMP GLOBE.
No. 563,836. Patented July 14, 1896.
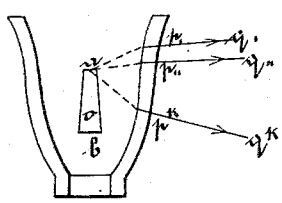
Fig. 33.
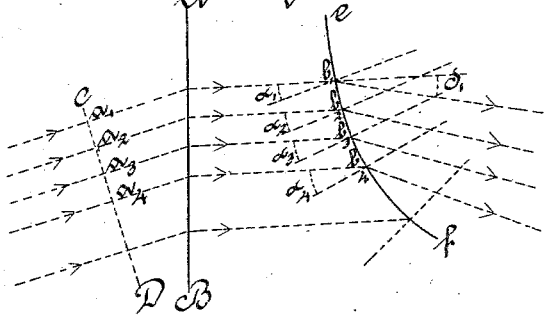
Fig. 34.
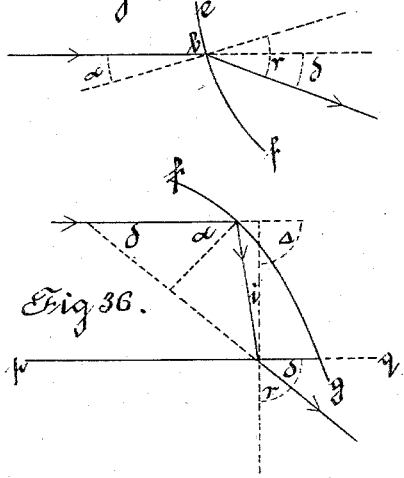
Fig. 35.
Fig. 36.
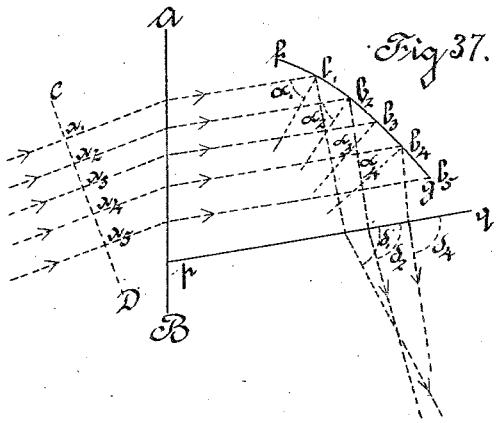
Fig. 37.
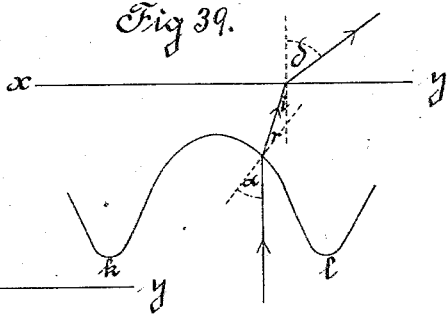
Fig. 38.
Fig. 39.
Fig. 40.
Inventors:
André Blondel and
Spiridion Psaroudaki
WITNESSES:
Wm H Handy
J L Arntzen
BY
Price Stuart
ATTORNEYS

UNITED STATES PATENT OFFICE.

ANDRÉ BLONDEL AND SPIRIDION PSAROUDAKI, OF PARIS, FRANCE.

LAMP-GLOBE.

SPECIFICATION forming part of Letters Patent No. 563,836, dated July 14, 1896.

Application filed March 30, 1895. Serial No. 543,921. (No model.) Patented in Germany March 16, 1893, No. 73,866; in France September 30, 1893, No. 233,140; in England October 12, 1893, No. 19,185; in Austria-Hungary January 6, 1894, No. 48,988, and in Belgium March 13, 1895, No. 108,985.

*To all whom it may concern:*

Be it known that we, ANDRÉ BLONDEL, a citizen of France, and SPIRIDION PSAROUDAKI, a citizen of Turkey, residing at Paris, in the Republic of France, have invented certain new and useful Improvements in Lamp-Globes; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention consists principally in globes, shades, reflectors, and other envelops for lights of all kinds, and is intended to substitute other characters of globes, principally such as are opal or ground, fluted or graded.

Our invention has been patented in France September 30, 1893, No. 233,140; in Austria-Hungary January 6, 1894, No. 48,988; in Germany March 16, 1893, No. 78,866; in England October 12, 1893, No. 19,185, and in Belgium March 13, 1895, No. 108,985.

Our globes are made of clear glass or crystal, and are so molded with prisms upon their exterior and interior as to refract and reflect the light passing through them, prevent its absorption, and direct its rays in any desired manner.

One of the primary objects of our globe is that the rays of light passing through it, while not being reduced in intensity, or lost by reflection, shall be broken up and diverted in all directions, so as to give the exterior surface of the globe a luminous appearance over its entire surface. In consequence of this peculiar luminosity we have called the globes "holophane," that is, entirely shining. In this particular they are peculiar, having great beauty as well as illuminating power.

A portion of our globes in some cases may be molded with a system of triangular prisms upon the exterior, which are so related to those on the interior as to produce a total reflection of light, thus throwing the light back upon the globe, and out through any desired portion thereof, without its loss in an undesired direction.

Our globes are constructed by molding transparent glass into any desired form, having vertical-meridianal flutings on the inner surface and horizontal parallel flutings or fluted rings on the outer surface. These flutings produce prisms on the inner and outer surfaces, said prisms having faces the angles and dimensions of which are calculated and molded in a manner which will be hereinafter explained:

*External flutings.*—These fluted rings or horizontal parallel prisms are intended to distribute and diffuse the light, so as to break up the rays and prevent the source of light from appearing as a point. The rays passing through the zones are mixed up, so to speak, with those emitted by the neighboring zones, so that an observer looking at one of our globes will see almost all of the flutings shining at the same time, and with a very soft intrinsic brilliancy throughout their entire extent. An opaque object placed within or without the globe upon its surface will not cast a shadow, in consequence of the fact that the illuminating capacity of the sides of the globe is as great as its center, and the intersecting rays of light emitted from the sides of a spherical globe, for instance, will so cross and intersect one another as to break up any shadow which might be produced.

The external prisms used upon our globes vary in form, the design being to calculate and determine their shape and dimensions in such a manner as to produce a uniform or other desired distribution of light by the globe especially adapted to the particular purpose of illumination for which the globe is used. The result is that the globe is covered with a number of series of prisms, each series differing from the adjacent series in shape and dimensions and producing a somewhat different effect upon the transmitted light.

The fundamental principle of our external prisms is that they consist of three essential faces, two of which are refracting and one of which is reflecting. Usually the prism has a fourth face, which we call a "neutral" face, because its direction is parallel to that of the incidental ray emanating from the source of light. In the further discussion and description of our invention we desire to be understood, when using the words "refracting" and "reflecting" faces, to mean faces which refract and reflect incidental rays, not rays which have been reflected by one or more external reflecting-faces. We shall therefore describe our invention as a globe, having horizontal prisms upon its exterior, the profiles of which are mixed, meaning by the word "mixed" a profile comprising one reflecting and two refracting faces, said faces reflecting or refracting incidental rays, as the case may be.

The faces of the prisms upon the exterior of our globes may be made straight or curved according to the desired distribution of light, all of which must be carefully calculated for each particular case by well-known mathematical laws. The mixed profiles enable us to realize an angle of diffusion greater than single profiles, and to secure the great advantage of avoiding loss of light by absorption and internal reflection. Each one of the flutings has in general a mixed profile analogous to the one shown in Figure 7 of the drawings. In determining the forms and shapes of these exterior mixed profiles, one line is first established which is parallel to the incidental ray from the source of light, and would therefore not be cut by it. This is called the "neutral line" or "face" of the prism. If the direction of this neutral face, for example, were inclined in such a manner as not to allow the opening of the mold without breaking the prism, it must be so altered as to permit the molding of the prism. It will then produce a small amount of reflection of light, these reflected rays being emitted, however, through one of the refracting-faces. The refracting and reflecting faces of the mixed profile are then determined by first locating the first refracting-surface, so as to produce the desired distribution of the incidental ray. Said surface may be either plane, concave, or convex, as the distribution requires, or by joining two refracting-surfaces together it may be concavo-convex. The extent of the refracting-surface is then limited so that the ray of light will not be reflected from it. We then determine in the same manner the reflecting part independently of the refracting part. The two parts of the prism, the refracting and reflecting faces, are then joined by placing the reflecting-surface between two refracting-surfaces of the same dimensions, or of different dimensions, if different distribution is desired.

The construction indicated may be varied in a great many ways, as the examples hereinafter illustrated show, but the principal remains the same. We realize the maximum of divergence, locating at the same time the profiles in such a way as to obviate all the angles which are too acute and prevent the rays coming from one fluting from meeting the next fluting. In certain cases we suppress the neutral lines between the flutings altogether, and cause the reflected rays to come out through refracting-faces. Examples of this are shown on the three profiles of the lower part of the globe in Figure 3, reproduced on a larger scale in Figs. 12, 13, 14, 15, and 27 of the drawings, may be seen. The calculation is made by determining first the refracting part, as above mentioned, then the reflecting part, and determining the direction followed by a certain number of rays. When, in consequence of the shape of the mold, you cannot trace the direction of the neutral face exactly according to the direction of the incidental rays, it will throw out some little light, but you arrange it in such a way that this light will not be important or thrown back in undesirable directions. When the source of light is of large dimensions, and in the axis of the globe, it is useless to make curved profiles. The globe can be rendered luminous with the profiles formed of planes.

For the purpose of clearness and amplification we insert a form of calculation which we have used in determining profiles of the external and internal flutings on any globe or shade of our system. The calculation for the exterior flutings is made by supposing the interior of the globe or shade smooth, and, conversely, for calculating the interior flutings the exterior is supposed to be smooth.

We may take the most ordinary case, that in which it is intended to direct the greater portion of the light downward symmetrically about the axis of the globe or shade.

The law according to which the light is to be distributed in the vertical plane is given by a curve in which the radii-vectors are made proportional to the desired intensity in the corresponding directions.

The first step is the drawing on a large scale the general form of the shade as if it were to be smooth both inside and out, choosing the outlines for artistic effect, Fig. 33, limited only by the condition that the piece must admit of molding in one or more parts. This done, a point on the axis of symmetry is selected as the optical center of the apparatus ($o$ in the figure) and the outline of the luminous source is sketched about this center as the middle point.

*Determination of the exterior horizontal rings or fluting.*—The outer meridian curve is now divided into sections, each of which marks the upper and lower limits of one horizontal ring. Mark the points of division $p$ $p'$ $p''$, &c., so that the profile of one complete ring will be contained between $p$ and $p'$, the next between $p'$ and $p''$, and so on. Each of the rings must have in general a mixed profile analogous to that of Fig. 7 of the drawings. There is a certain line of the profile, known in advance, which can be traced at once, namely, that which lies in the direction of the rays of light within the glass, so as not to be encountered by them. This we may call for convenience the "neutral line" of the profile.

When the source is a point, the neutral lines $p\,q\ p'\,q'\ p^k\,q^k$, &c., are readily determined by drawing from each point $p\,p'\,p''$, &c., a line in the direction of the rays of light incident at these points after refraction at the inner surface. If the source is large, a point at the top of the source is taken as the origin of the rays, as in Fig. 33.

When the direction of a neutral line as fixed by this rule—$p^k\,q^k$, for example—is such as to prevent the opening of a mold without breaking the glass, it is to be replaced by a horizontal line. This modification entails a certain reflection, which will be referred to later.

In general, a portion or portions of each ring is to alter the direction of the transmitted rays by refraction only and another portion by total reflection followed by refraction. That portion which acts in the first of these methods is called the "dioptric," and that which acts in the second manner is called the "catoptric" part. The profiles of these two parts are calculated separately, under the assumption that all the light comes from the optical center, and the manner in which they are to be combined is left to subsequent consideration.

*Dioptric part.*—For this a profile is to be determined which distributes the light passing through it as nearly as possible in accordance with the law imposed. Upon a separate sheet, on a large scale, a line A B, Fig. 34, is drawn, which represents the inner surface of the shade or globe to be considered; also lines (dotted in the figure) which represent the rays of light before and after refraction at this surface. This may be simplified in practice by observing that the breadth of the ring is so small, compared to its distance from the source $o$, Fig. 33, that A B can be regarded as a straight line and the rays all parallel before, and hence also after, refraction.

In order to show the method of calculating the form of the profile, we must establish a law for the change of direction of a ray of light in passing from glass into air. For this purpose let $e\,f$ in the accompanying Fig. 35 represent the trace of the refracting-surface on the plane of the paper, and let the directed line represent the ray of light refracted at $b$ in passing out from the glass into air. The angle of interior incidence is $\alpha$ and the angle of refraction is $\gamma$. From the figure the change in direction of the ray $\delta$ is given by the equation $$\delta = \gamma - \alpha,$$

whence

Sin. $\delta$ = sin. $(\gamma - \alpha)$ = sin. $\gamma$ cos. $\alpha$ — cos. $\gamma$ sin. $\alpha$.

From the law of refraction we have $$\text{Sin. } \gamma = n \text{ sin. } \alpha,$$

whence

Cos. $\gamma = \sqrt{1 - \sin.^2 \gamma} = \sqrt{1 - n^2 \sin.^2 \alpha}$.

Substituting these values of sin. $\gamma$ and cos. $\gamma$ in the above equation for sin. $\delta$, we have Sin. $\delta = n$ sin. $\alpha$ cos. $\alpha$ — sin. $\alpha \sqrt{1 - n^2 \sin.^2 \alpha}$, or, finally, (a) Sin. $\delta = $ sin. $\alpha\ (n \cos. \alpha - \sqrt{1 - n^2 \sin.^2 \alpha})$.

From this equation we may compute a useful table of values of $\delta$ corresponding to determined values of $\alpha$. For example, a very much abridged table for the case of $n = \dfrac{3}{2}$ follows:

*Table I.*

| $\alpha$ | $\delta$ |
|---|---|
| 10° | 5° 5′ 52″ |
| 20° | 10° 51′ 57″ |
| 30° | 17° 35′ 25″ |
| 35° | 24° 21′ 34″ |
| 40° | 34° 37′ |
| 41° | 38° 46′ |
| 41° 48′ | 48° 11′ 20″ |

Now, turning to Fig. 34, through any convenient point of the broken ray $a\,b$, say at $b$, draw a line making an angle $\alpha$ with the ray such that if this be the angle of incidence the table yields the desired value for the deviation after refraction; the complement of the angle $\alpha$, as appears from the figure, is the angle at which the profile $e\,f$ cuts the ray $a\,b$. Extending the same process to the other rays we may determine the successive angles at which $e\,f$ cuts each ray in turn, and therefore the problem of construction is reduced to drawing a curve which shall cut a series of parallel lines at determinate angles. This process premises the knowledge of the required deviations $\delta'\ \delta^2\ \delta^3$, &c. The mean value of these is known from the fundamental data of the problem of illumination. The differences are determined from the following consideration: The angular diffusion in a vertical plane of the light which passes through a narrow ring, of which $b'\,b^2$ is the profile, is equal to $a'\,a^2$, Fig. 34, divided by its distance from the source, namely, to $\dfrac{a'\,a^2}{a'\,o}$.

After refraction the angular diffusion becomes equal to $\delta^2 - \delta'$. Hence the illumination on sources equally distant from the naked source and from the ring, in so far as it is due to this portion of the light, will be in the inverse ratio of these angles of spread. We may call the mean intensity of emission in the direction $\frac{\delta^2+\delta'}{2}$ equal to this ratio of illumination, that is, to $\frac{a'\,a^2}{a'\,o}\frac{1}{\delta^2-\delta'}$.

From this definition of intensity we may compute beforehand the values of $\delta^2-\delta'$, $\delta^3-\delta^2$, &c., to fit any prescribed law of illumination, and the problem becomes determinate.

In the example figured $\delta^2$ is made greater than $\delta'$; but since the intensity depends only on the value of the difference of these two angles and not at all on their sign we may obtain the same effect if $\delta^2$ is less than $\delta'$ by the same amount. This would make the profile convex instead of concave. From this consideration it also follows that we may equally well make a portion of the profile convex and another portion concave, thus making a point of inflection at any desired portion of the line.

Should the profile thus traced yield anywhere angles of incidence greater than thirty-five degrees or forty degrees, according as economy of light is of greater or less importance, it will be necessary to restrict its extent, thus making narrower zones. When the source is of considerable extent, the paths of the rays from its boundaries must be examined in fixing the length of the profile curve.

*Catoptric part.*—In order to explain the theory of the construction of this portion of the profile of the exterior zones, we must establish a formula for the deviation of a ray after an internal reflection followed by a refraction at a neutral surface. In the accompanying diagram, Fig. 36, let $fg$ be the trace of the reflecting-surface and $pq$ that of the refracting-surface. Also let the directed lines represent the path of the ray which suffers reflection first and then refraction. Let $\Delta$ represent the change of the direction of the ray from reflection and $\delta$ the final deviation after emergence from the glass. It is required to find a general expression for $\delta$.

Since the neutral line $pq$ is by definition parallel to the ray before it meets the reflecting-surface $fg$, we recognize the following geometrical relations by inspection:

$$\Delta = 180° - 2\alpha. \quad (1)$$

$$i = 90° - \Delta. \quad (2)$$

$$\delta = 90° - \gamma. \quad (3)$$

From the law of refraction $$\sin.\,\gamma = n \sin.\,i,$$

whence from (3)

$$\cos.\,\delta = \sin.\,\gamma = n \sin.\,i,$$

from (2)

$$\sin.\,i = \cos.\,\Delta,$$

from (1)

$$\cos.\,\Delta = -\cos.\,2\alpha,$$

and by successive substitutions we have, finally, $$(b)\ \cos.\,\delta = -n \cos.\,2\alpha.$$

From this equation we may compute a table giving by inspection the value of $\delta$ for a given value of $\alpha$. For example, we give below (Table II) a short table of values for the case of $n = \frac{3}{2}$:

Table II.

| $\alpha$ = | | $\delta$ = | |
|---|---|---|---|
| 41 | 38 | 100 | 5 |
| 45 | .. | 90 | .. |
| 47 | 30 | 82 | 35 |
| 50 | .. | 74 | 52 |
| 52 | 30 | 67 | 50 |
| 55 | .. | 59 | 8 |
| 57 | 30 | 50 | 29 |
| 60 | .. | 41 | 36 |

In case the neutral line is modified in direction on account of the exigencies of molding, the above equations require change. Let us suppose the face represented by the line $pq$, Fig. 36, slopes upward to the right from its present position by the angle $\theta$, then the angle of interior incidence $i$ will be decreased by this value and the above equations become $$\Delta = 180° - 2\alpha. \quad (1)$$

$$i = 90° - \Delta - \theta. \quad (2)$$

$$\left.\begin{array}{c}\delta = 90° - \gamma - \theta. \\ \delta + \theta = 90° - \gamma.\end{array}\right\} (3)$$

Whence $$\cos.\,(\delta + \theta) = \sin.\,\gamma = n \sin.\,i = n \cos.\,(\Delta + \theta),$$

and, finally, $$(c)\ \cos.\,(\delta + \theta) = -n \cos.\,(2\alpha - \theta).$$

We have therefore in this modified case also a means of finding $\delta$ for given values of $\alpha$ and $\theta$, but as it involves two arbitrary variables any one table of computed values would be of very limited utility.

The problem of determining the profile of the reflecting portion of the ring is now reduced to exactly the same form as the one already discussed of constructing the profile of the dioptric portion. Moreover, subject to the same qualifications as above, we have an identical expression for the intensity of emission in the direction defined by $\frac{1}{2}(\delta^2+\delta')$, namely, $\frac{a'\,a^2}{a'\,o}\frac{1}{\delta^2-\delta'}$.

Fig. 37 illustrates the process of construction when, as before, A B represents a portion of the inner profile of the shade, $fg$ the profile of the reflecting portion of the zone, and $pq$ the neutral line. The dotted directed lines represent the courses of a number of rays, and the angles $\alpha' \alpha^2 \alpha^3$, &c., $\delta' \delta^2 \delta^3$, &c., are the angles of interior incidence and final deviation, respectively.

The extent of the profile $fg$ is limited in this case by the condition that the reflected rays should not meet the surface of emergence at so great an angle as to make the loss by reflection excessive. If we set thirty-five degrees as the largest angle of interior incidence permissible it may be seen from equations (1) and (2) ($pq$) that the useful values of $\alpha$ in Table II lie in general between forty-five degrees and sixty-two degrees five minutes.

It may be noted in passing that a glance at Table I shows that by a dioptric surface alone a range of deviation from zero to about thirty degrees only can be secured without surpassing the internal angle of incidence, which implies a great waste by reflection. Again, the remarks immediately above concerning the limits of Table II show that the range of deflections from the catoptric element extends from about thirty degrees to ninety degrees. This is the mathematical proof of the statement made in the specification that both are essential if a large range of deflections is required.

*Joining of the two parts.*—The two portion of the profile of a horizontal ring having been determined as above, so as to yield the desired diffusion of light, the dioptric profile is cut into two parts, between which is introduced the catoptric profile. This arrangement is illustrated in Fig. 38, where $ef$ represents one portion of the profile $ef$ of Fig. 34 and $gh$ the remainder, including between them the catoptric profile $fg$ of Fig. 37. When the two profiles possess parts both of which deflect light in the same directions, one of the parts may be suppressed, but it is better to retain half of each, so as to avoid concentrating the light more than is necessary in the common directions.

Instead of dividing the dioptric profile into two parts one can repeat it, reduced in scale by one half, above and below the catoptric profile, and obviously attain the same ends. As mentioned above, also, the angles of the figure may be reduced by employing a convex instead of a concave dioptric profile.

Through the points $e$ and $h$ are drawn the neutral lines $pq$ and $p'q'$. There remains then only the process of reducing, by photography or otherwise, the drawing to the scale required for the chosen height of the ring.

The construction thus indicated admits of a variety of modifications, as is obvious from the examples figured in our drawings, but the principle remains the same. The maximum of divergence in the desired direction is secured by such a disposition of the profiles as to avoid too acute edges in the rings; and also to prevent rays emerging from one ring falling on an adjacent one.

In certain cases the neutral lines between the rings are suppressed and the rays reflected from the catoptric portion of the ring are made to emerge from the neighboring dioptric surface. Examples of this case are found at the base of the globe shown in section in Fig. 3 and reproduced on a large scale in Fig. 15. The calculation is made by first finding the dioptric profile, as above, after which the catoptric portion is traced in successive small segments by determining the course of a sufficient number of rays.

When the form of the mold forbids tracing the neutral lines exactly parallel to the rays within the glass, they will reflect a small amount of light, but this can be made insignificant and arranged so that the directions taken by these reflected rays shall be as far as possible favorable.

If the course is large in the direction of the axis of the globe or shade, it is unnecessary to make the profiles curved, since the shade can be rendered satisfactorily holophane with rectilinear profiles. In this case the lines $ef$ and $gh$, Fig. 38, are placed at the same or different inclinations, so that the emergent light, divergent on account of the dimensions of the source, shall have the required general direction, and then the reflecting portion $fg$ is so placed that light incident upon it shall, after final refraction at $p'q'$, extend the illumination from the region where the illumination from the other portions of the ring ceases to the region under the shade.

In the lower part of the globes or shades intended to light up the region underneath only, the reflecting portion $fg$ of some of the lowest rings may be omitted, but they are necessary for the higher rings. Finally, when we employ complete globes we cease to use the rings with mixed profiles above a region where they are no longer able to direct sufficient light downward, and replace them by rings, such as we have already described, which reflect the light back into the interior of the globe.

*Determination of the interior flutings or meridianal grooves.*—The profile is calculated for the largest horizontal section of the globe or shade, disregarding altogether the external zones. We have already stated the principle of these interior grooves. The sole condition that must be met in the profile, in order that the globe may be holophane in a horizontal direction, is that a portion of this line shall indicate a very large angle of incidence—70° to 75°, according to the character of the material employed. This, however, is by no means the only condition to be observed in order to insure the best results. From mechanical considerations already mentioned sharp edges in these grooves are to be avoided. Again, as is satisfactorily shown in Figs. 17 and 18, grooves with broad furrows and narrow ridges are far more satisfactory than those of a reverse type, since the loss of light reflected at first point of incidence is less. Finally, although the condition first mentioned practically secures the shining of the globe across its whole surface, the law of variation of brightness in approaching the sides from the center is determined by the form of the groove. In order to show the method of determining this form, it is necessary to derive a law connecting the angle of deviation with the angle of incidence for the general case. Since the grooves are narrow compared to the distance of the source, we may suppose, as in the other cases, that the rays falling upon one groove are all parallel, and that the section of the outer surface for this extent is straight. Thus in Fig. 39 let $x\,y$ represent the outer surface of emergence and $k\,l$ the profile of the groove. Also, let the directed line represent the course of the ray having the angle of incidence $\alpha$, angle of first refraction $\gamma$, angle of interior incidence $i$, and second angle of refraction $\delta$. This last-named angle is also the angle of deviation. It is required to find an expression connecting $\delta$ and $\alpha$.

From the law of refraction we have, $$\text{Sin. } \delta = n \sin. i; \quad (1)$$

but, as appears from the figure, $$i = \alpha - \gamma, \quad (2)$$

and, again, from the law of refraction, $$\text{Sin. } \gamma = \frac{1}{n} \sin. \alpha, \quad (3)$$

whence $$\text{Cos. } \gamma = \frac{1}{n}\sqrt{n^2 - \sin.^2 \alpha}. \quad (4)$$

From (2) we may write $$\text{Sin. } i = \sin. \alpha \cos. \gamma - \cos. \alpha \sin. \gamma.$$

Substituting in the last equation the values of sin. $\gamma$ and cos. $\gamma$ as given in (3) and (4), we have $$\text{Sin. } i = \frac{1}{n}[\sin. \alpha \sqrt{n^2 - \sin.^2 \alpha} - \sin. \alpha \cos. \alpha],$$

and, finally, combining this last equation with (1), $$(d) \text{ Sin. } \delta = \sin. \alpha [\sqrt{n^2 - \sin.^2 \alpha} - \cos. \alpha].$$

The values of $\delta$ for a small number of values of $\alpha$ are given as an example in Table III below. The assumed value of $n$ is, as before, equal to $\frac{3}{2}$.

Table III.

| $\alpha$ = | $\delta$ = |
|---|---|
| 10° | 5° |
| 20° | 10° 15′ |
| 30° | 15° 53′ |
| 40° | 22° 13′ |
| 50° | 29° 40′ |
| 60° | 38° 55′ |
| 70° | 51° |
| 80° | 70° 20′ |
| 83° 16′ | 90° |

To utilize the data of this table, it is necessary to fix upon some law of diffusion in the horizontal direction. The most generally useful law would be that which makes the globe or shade appear not only bright all over its surface, but uniformly bright. In order that a curved surface may appear to the eye equally bright throughout, the intensity of emission must, in accordance with a well-known law in optics, vary as the cosine of the angle of emission. This, therefore, is the condition which must be observed, as we shall proceed to show that it is quite sufficient to determine the profile for all holophane shades.

From Table III, sufficiently extended, take out successive values of $\alpha$ for chosen values of $\delta$ differing, say, by intervals of five degrees. Let $a'\,a^2$, $a^2\,a^3$, $a^4\,a^5$, &c., Fig. 40, represent the distances, as yet unknown, from one line to the next representing the paths of the rays before incidence which have, after the second refraction, the deviations $\delta'\,\delta^2\,\delta^3$, &c. It is easy to see from the reasoning given at length in the discussion of the dioptric profile of the horizontal rings that the relative mean intensity of light emitted in the direction $\frac{\delta^2 + \delta'}{2}$ is equal to the identical expression $\frac{a'\,a^2}{a'\,o}\frac{1}{\delta^2 - \delta'}$, the line $a'\,o$ being the distance of the source. Like forms would hold for the other parts of the section. If now we set $$\frac{a'\,a^2}{a'\,o}\frac{1}{\delta^2 - \delta'} = \cos. \frac{1}{2}(\delta^2 + \delta'),$$

$$\frac{a^2\,a^3}{a'\,o}\frac{1}{\delta^3 - \delta^2} = \cos. \frac{1}{2}(\delta^3 + \delta^2),$$

and so on for all other values of $\delta$, we have at once the relative values of $a'\,a^2$, $a^2\,a^3$, $a^3\,a^4$, &c., since the successive values of $\delta$ differ by a constant. The distances thus determined are laid off according to any convenient scale on the line A B, and through the points $a'\,a^2\,a^3$, &c., parallel lines are drawn to represent the incident rays before refraction, Fig. 40. We have now only to draw a curve, commencing at any convenient point on one of the lines $a\,b$, which shall cross the parallel lines at angles complementary to their corresponding angles of incidence ($\alpha$) already tabulated. This curve is the profile which meets the condition of uniform brightness.

There are many different methods of finding this unique curve, and the one given must serve merely as an example. Of course, if the index of refraction of the glass is other than $\frac{3}{2}$ the curve will be somewhat different.

The portion of the profile used should not, in general, imply an angle of incidence much greater than seventy degrees, since larger angles cause a pretty rapidly-increasing loss of light, and also because experience shows that this is enough to give a satisfactory effect. Should the source of light be large, it is well not to have the angle of incident light from any portion much above this limit.

In order to avoid sharp edges, as well as to prevent one groove interfering with the extreme rays from the next, one concave profile is connected with the adjacent one by a similar curve, reversed in position and generally smaller, as is sufficiently represented in Fig. 17.

*Internal flutings.*—The object of our internal flutings is to diffuse, and sometimes to distribute, the light in a horizontal direction, but always to give to the light striking upon the internal flutings a horizontal distribution by refraction of so great an extent that when the ray emerges from the exterior surface of the globe it will have a direction more or less tangential to the globe. We calculate the profile of the horizontal section of these flutings by a method similar to that employed for the external rings, that is to say, we make each of the flutings diffuse its light within the largest possible angle of divergence and precisely according as the light is desired for horizontal distribution. We obtain thus the important result that the envelop or globe becomes shining over its entire surface. In the most complicated cases, where the light is to be distributed unequally, each of the flutings must have a dissymmetrical profile, analogous to that shown in Fig. 22, but under ordinary circumstances it is only necessary to distribute the light uniformly in a horizontal direction and all the interior flutings may have one similar and symmetrical profile, analogous to that shown in Figs. 17 and 31.

We consider it desirable in all cases that the shining surface may extend from the center to the edge of the envelop or globe, and that its apparent brilliancy shall be nearly uniform. We obtain this result by giving to the profile of our interior flutings an obliquity almost equal to twenty degrees from the direction of the incidental rays. The angles of incidence of about seventy degrees thus realized are theoretically too small to allow the rays to go out tangentially from the surface of the globe, but in practice it is sufficient to let the shining surface seem to reach the apparent edges, and we shall explain in the next paragraph that a greater angle of incidence would cause loss of light.

We give to the internal flutings a concave, convex, or concavo-convex profile, so calculated that in a horizontal section, such as Fig. 17, the group of rays emitted presents in each direction an intensity proportioned to the cosine of the apparent angle of emission. The profiles of Figs. 17 and 31 each present the same properties of diffusion, both being calculated in this way.

Our internal flutings are constructed with a curved bottom, generally semicircular, having narrow ribs separating them, the sides of which extend rectilinear, and, the apex of these ribs being convex, the radius of the curve forming the apices of the ribs is determined by the angle of refraction of the glass, and they are so located in relation to the planes on each side of the rib as to refract rays which, if they passed into the dividing rib through the plane surfaces, would intersect the adjacent fluting. This is illustrated in Figs. 17 and 31.

Referring to the drawings, Fig. 1 is a vertical section of one of our globes designed to be used for an arc-lamp. It is constructed with horizontal flutings upon its exterior which refract and reflect the light in all portions except at the top, where the flutings are of a different form and relation and act as a reflector. Fig. 2 is a horizontal section of the same globe, showing the shape of the internal flutings and also showing the distribution and the refraction of light by the prisms on the inside of the globe. Fig. 3 is a vertical section similar to Fig. 1, the exterior surface of which is provided with a series of prisms which are horizontal and concentric, each section having prisms of a similar shape, the sections arranged one after the other in such relation to one another as to produce a desired effect in distribution. The section between zero and twenty degrees is covered with prisms, which are shown in vertical sections in Fig. 15. The portion between twenty and thirty-five degrees is shown on an enlarged scale in Fig. 14. The portion between thirty-five and sixty-five degrees is shown on a large scale in Fig. 27. The portion between sixty-five and eighty-five degrees is shown on a large scale in Fig. 13; between eighty-five and ninety-five degrees is shown on an enlarged scale in Fig. 22; between ninety-five and one hundred and ten degrees is shown on an enlarged scale in Fig. 11; between one hundred and ten and one hundred and thirty-five degrees is shown on an enlarged scale in Fig. 10, and between one hundred and thirty-five and one hundred and eighty degrees is shown on an enlarged scale in Fig. 9. Fig. 4 is a globe or shade designed for a gas-burner, such, for instance, as a bat-wing burner. This shade has a reflector at the base, for the purpose of throwing the light upward, and distributing-prisms upon its sides, which are constructed substantially in a manner similar to that shown in Fig. 7. Fig. 5 is a diagram showing the contour of triangular prisms which would cause destruction and loss of light. Fig. 6 is a similar diagram showing loss of light. Fig. 7 is a diagram showing the form of mixed profile which constitutes the fundamental element of our invention so far as external prisms are concerned. Fig. 8 is a diagram showing the form of exterior reflector-prisms which may be used in Fig. 3 between one hundred and thirty-five and one hundred and eighty degrees. Fig. 9 is the same, having different angles to avoid source of light. Fig. 10 is an illustration of the same form of prism shown in Fig. 7, which constitutes our invention, modified in position, so as to produce a desired distribution, used on Fig. 3 between one hundred and thirty-five and one hundred and ten degrees. Fig. 11 is another application of our principle applied to produce a different specific result, used on Fig. 3 between one hundred and ten and ninety-five degrees. Fig. 12 is another application of our invention designed to produce a specific degree and direction of distribution, used on Fig. 3 between ninety-five and eighty-five degrees. Fig. 13 is another form in which the prism consists of three faces, the two refracting-surfaces being one concave and the other convex, with an intermediate reflecting-surface between them, or the prism might more properly be described as consisting of a reflecting-surface and a concavo-convex refracting-surface, used on Fig. 3 between eighty-five and sixty-five degrees. Fig. 14 illustrates the form of prism used, for instance, between twenty and thirty-five degrees, in which there are two reflecting-surfaces and two refracting-surfaces, one of the refracting-surfaces being curved. Fig. 15 is a diagram of the form of prism used at the bottom of a circular globe, between zero and twenty degrees, in which the faces of the prisms consist of a convex refracting, a convex reflecting, a concave refracting, and a convex reflecting surface. Fig. 16 represents the form of the interior fluting having triangular prisms which coöperate with the exterior reflecting-prisms to produce a complete reflector. These prisms may be modified so as to produce a partial diffusion, as shown in dotted lines in this figure. Fig. 17 is a diagram showing the form of internal flutings in our globe, showing the refraction and distribution of the rays of light which fall within the fluting. Fig. 18 illustrates a form of internal fluting used by Trotter in some of his globes, as illustrated in his Patent No. 330,356, dated November 10, 1885, and shows the way in which light is lost and destroyed by refraction and reflection therein. Fig. 19 shows a form of globe used for incandescent lamps. Fig. 20 shows a form of globe used for the Auer or Welsbach burners. Fig. 19$^b$ shows the diagram of the mixed profile used upon the exterior of globe 20 and a greater portion of globe 19. Fig. 21 is a vertical elevation, partly in section, of a globe, part of which is diffusing and the upper portion of which is totally reflecting. Fig. 22 is a modified form of internal fluting in which the axis of the rib between the flutings is inclined. This inclining of the axis of the rib produces an unequal refraction and distribution of the light within the globe, and while it is not quite so economical as the other form it may produce somewhat greater brilliancy in the globe. Fig. 23 is a vertical elevation, partly in section, of a globe for an ordinary gas-burner, a portion of which is diffusing and the upper portion of which is totally reflecting. Figs. 24, 25, and 26 are diagrams illustrating bad forms of fluting, which will cause a destruction of light. Fig. 27 is a calculated form of our invention used upon the globe between the angles thirty-five and sixty-five degrees. It consists of a prism having three plane and two curved surfaces, one only of which is reflecting, the rest being refracting. Figs. 28, 29, and 30 show the modification of forms made by transposing parts of the prisms from one position to another to produce desired results. Fig. 31 is another view, similar to Fig. 17, showing the form of internal flutings and the refraction and distribution of light falling upon the apex of the rib. Fig. 32 is another view of the form of Trotter's internal flutings, showing the loss of light resulting therefrom. Figs. 33, 34, 35, 36, 37, 38, 39, and 40 are diagrams illustrative of mathematical formulæ, by which the external prisms and interior meridional grooves are calculated and determined.

Referring now to Fig. 3, it will be seen that the upper portion of the globe is provided with a series of horizontal flutes upon the exterior, which are triangular in shape. These triangular prisms when combined with the internal flutings will produce total reflection in that portion of the globe. They may be modified, however, so as to produce partial diffusion, as shown in Fig. 8, and prevent a black spot upon the globe.

The next section, between one hundred and thirty-five and one hundred and ten degrees, has prisms, shown in Fig. 10, in which the prisms are overhanging, or inclined downward, so that the rays of light refracted by the planes $a\ b$ and $c\ d$ will be thrown down at a considerable angle below the horizontal, while the rays of light reflected from the surface $b\ c$ will be refracted through the neutral face and still fall to the ground.

The portion of the globe between one hundred and ten and ninety-five degrees is covered by prisms shown in Fig. 11, in which the refracting-surfaces are different in form, one being curved, the other plane, the reflecting-face being curved. $a'\ b'$ is a refracting-surface which is convex and in which the rays of light cross one another. $b'\ c'$ is a reflecting-surface from which the rays of light emerge through the neutral face of the prism. $c'\ b'$ is a refracting-face from which the rays of light diverge toward the ground.

Between ninety-five and eighty-five degrees the profile shown in Fig. 12 is employed, which consists of a concavo-convex refracting-face, a plane reflecting-face, and a plane or curved refracting-face, and a face which would be neutral if it were parallel to the incidental ray, but, inasmuch as it would be difficult, if not impossible, to mold the prism in a form in which this face was parallel to the incidental ray, it is reduced in such a manner as to be partially reflecting, but the rays reflected from it are emitted by the refracting-face $c\ d$. The surface $a\ b$ of Fig. 12 is concavo-convex, $b\ c$ is plane, $c\ d$ is plane, and $d\ a'$ is plane.

The portion of the globe between eighty-five and sixty-five degrees is illustrated in Fig. 13, in which the prism consists of three faces, $b\ a'$, which is plane and reflecting, and $a'\ b'$, which is concavo-convex; or the prism may be divided differently. The concave and convex surfaces may be considered as independent, and the profile may be subdivided into concave, convex, and plane, the first two being refracting and the latter reflecting, or into convex, plane, and concave, the convex being refracting, the plane being reflecting, and the concave being refracting.

The section between sixty-five and thirty-five degrees has prisms, shown in Fig. 27, in which the profile consists of a plane reflecting, a plane refracting, concavo-convex refracting, and a plane refracting surface.

The section between thirty-five and twenty degrees has a profile similar to Fig. 14, in which the prism consists of a reflecting-surface, two plane refracting-surfaces, and a convex refracting-surface. The triangular prisms which constitute the reflector at the top of the globe are illustrated in Figs. 8 and 9.

In order to get complete reflection, the prisms should be triangular on the exterior and also triangular upon the interior, but it is generally desirable, in a street-lamp, for instance, not to have a dark section of the globe visible. In order, therefore, to prevent this, the external prisms are slightly modified, as shown in Fig. 8 in dotted lines, one of the faces being reflecting and part of another of the faces of said prisms adapted to distribute the light, and those on the interior are slightly modified, as shown in Fig. 16 in dotted lines. These modifications will cause a small amount of diffusion and prevent a black spot upon the surface of the globe.

Fig. 21 shows the form of a reflector. The prisms on this portion of the globe (or the reflector may be used independently) are triangular in shape, concentric, and located upon the convex surface of a curved body. The interior prisms, to make complete reflections, should be triangular also. They are located at right angles to those on the exterior of the reflector and radiate from a center which is coincident with the center of the circles of the exterior prisms. This reflector has been made the subject of a divisional application pending simultaneously with this one, Serial No. 593,653, filed May 29, 1896, for a reflector.

Referring to Figs. 17 and 31, these diagrams show the form of interior flutings where they are used in conjunction with the exterior flutings, having mixed profiles. The flutings are large at the bottom, divided by narrow ribs, the ribs being convex upon their extremities and the ribs being much narrower than the flutings. The bottom of the fluting is generally made the arc of a circle—generally a half-circle—the sides of the ribs being extended so as to form rectilinear surfaces, and the apices of the ribs being convex. The extent of these ribs and the position of the curves upon their edges is determined by the direction of the refracted ray. They are made so high only as to permit the last ray refracted by the plane surface to escape the adjacent fluting. The refraction of the rays from the apex of the rib is shown in Fig. 32.

Having thus described our invention, what we claim, and desire to secure by Letters Patent, is—

1. A lamp globe or shade constructed with a series of exterior prisms, each prism having a mixed profile substantially as described.

2. A lamp-globe constructed with a series of exterior and interior prisms, the exterior ones being horizontal prisms, and the interior vertical, the prisms upon the upper part of the globe forming a reflector which reflects its light interiorly, and those below refracting, substantially as described.

3. A lamp globe or shade constructed with a series of horizontal prisms upon its exterior, one or more of said prisms having a mixed profile composed of two refracting and one reflecting face.

4. A lamp globe or shade constructed with a series of horizontal prisms upon its exterior, one or more of said prisms having a profile composed of two refracting and one reflecting face, and one face parallel to the incidental light-ray.

5. A lamp-globe having a series of horizontal prisms on its outer surface one or more of said prisms having a reflecting and a refracting face, and one face parallel to the incidental light-ray.

6. A lamp globe or shade constructed with a series of horizontal prisms upon its exterior, one or more of said prisms having two main faces one of which is approximately parallel to the incidental light-ray and the other is composed of two refracting and one intermediate reflecting surface.

7. A lamp-globe made of clear transparent glass of curved or spherical form, provided on its exterior with a series of horizontal prisms one or more of which have a mixed profile, said prisms being arranged in series and being of different profiles according to their relative positions to the point of light and point of distribution, in combination with a series of vertical prisms upon the interior of the globe whereby the globe is caused to shine entirely over its whole surface.

8. A lamp-globe formed of a curved or spherical body provided with a series of external horizontal prisms one or more of which have a mixed profile, in combination with interior vertical prisms.

9. A lamp-globe provided on its exterior surface with a series of horizontal prisms one or more of said prisms having a mixed profile, the prisms of each series being of different profile and being arranged so as to produce a uniform distribution of light and to cause the globe to be wholly luminous throughout its entire surface.

10. A lamp-globe provided on its exterior surface with a series of horizontal prisms one of the faces of said prisms being reflecting and part of another of the faces of said prisms adapted to distribute the light.

11. A lamp-globe provided on its exterior surface with a series of horizontal prisms one or more of said prisms being formed of two connected refracting-faces and a reflecting-face.

12. A lamp-globe provided on its exterior surface with a series of horizontal prisms one or more of said prisms being composed of one reflecting, one concave refracting, and one convex refracting face.

13. A lamp-globe provided on its exterior surface with a series of horizontal prisms one or more of said prisms having one reflecting-surface and having a refracting-surface formed of a concave face joined with a convex face.

14. A lamp-globe provided on its exterior surface with a series of horizontal prisms one or more of said prisms being formed of a reflecting-face and a connected straight and curved refracting-face.

15. A lamp-globe provided on its exterior surface with a series of horizontal prisms one or more of said prisms formed of a reflecting-face, two straight refracting-faces, and a curved refracting-face between them.

16. A lamp-globe provided on its exterior surface with a series of horizontal prisms one or more of said prisms composed of two reflecting and two refracting faces, the refracting-face and the reflecting-face being alternately arranged.

17. A lamp-globe provided on its exterior surface with a series of horizontal prisms one or more of said prisms composed of two reflecting and two refracting faces, the refracting-faces and the reflecting-faces being alternately arranged, one of the refracting-faces being convex.

18. A lamp-globe provided on its exterior surface with a series of horizontal prisms one or more of said prisms composed of two reflecting and two refracting faces, the refracting-faces and the reflecting-faces being alternately arranged, one of the refracting-faces being convex and the other concave.

19. A lamp-globe provided on its exterior surface with a series of horizontal prisms one or more of said prisms being formed of two refracting and two reflecting faces, the outlines of said faces being curved.

20. A lamp-globe provided on its exterior surface with a series of horizontal prisms one or more of said prisms being formed of two refracting and two reflecting faces, one or both of the reflecting-faces being curved.

21. A lamp-globe provided on its exterior surface with a series of horizontal prisms one or more of said prisms having refracting and reflecting faces, a portion of the outlines of the refracting-faces being curved.

22. A lamp-globe provided on its exterior surface with a series of horizontal prisms one or more of said prisms having refracting and reflecting faces, a portion of the reflecting-faces being curved.

23. A lamp-globe provided on its exterior surface with a series of horizontal prisms, one or more of said prisms having refracting and reflecting faces, a portion of the refracting-faces being concave.

24. A lamp-globe provided on its exterior surface with a series of horizontal prisms, one or more of said prisms having refracting and reflecting faces, one of the refracting-faces being concave, and another convex, with an intermediate reflecting-face.

25. A lamp-globe provided on its exterior surface with a series of horizontal prisms, one or more of said prisms having refracting and reflecting faces, a refracting-face being convex, and having an intermediate reflecting-face which is convex between the first refracting-face and the next refracting-face.

26. A lamp-globe provided on its interior surface with a series of vertical flutes which are concave at their bottoms, having extended sides and the rib between adjacent flutes being convex upon its extremity.

27. A lamp-globe provided on its interior surface with a series of vertical flutes the bottoms of which are concave, of large radius and having ribs between them the apices of which are convex and of smaller radius.

28. A lamp-globe provided on its interior surface with a series of vertical flutes the bottoms of which are convave, of large radius, and having ribs between them the apices of which are convex and of smaller radius, the two curves being separated by a plane surface.

29. A lamp-globe provided on its interior surface with a series of vertical flutes which are concave at their bottoms and separated by narrow ribs.

30. A lamp-globe provided on its interior surface with a series of vertical flutes which are concave at their bottoms and separated by narrow convex ribs.

31. A lamp-globe provided on its interior surface with a series of vertical flutes concave at their bottoms, separated by ribs, the axis of each rib being inclined to the radius of the curve of the globe.

32. A lamp-globe provided on its exterior surface with a series of horizontal prisms, part of said prisms being wholly reflecting and part having faces adapted to distribute light, in combination with a series of internal vertical flutes concave at their bottoms and separated by ribs.

33. A lamp-globe provided on its exterior surface with a series of horizontal prisms, one or more of said prisms formed of two connected refracting-faces and a reflecting-surface, in combination with a series of internal vertical flutes concave at their bottoms and separated by narrow ribs, substantially as described.

34. A lamp-globe provided on its exterior surface with a series of horizontal prisms composed of two refracting and a reflecting face, in combination with a series of internal vertical flutes, said flutes being concave at their bottoms and separated by narrow ribs.

35. In a lamp globe or shade the combination of a series of external horizontal flutes with a series of internal vertical flutes offering to the incidental rays of light from a contained source an angle of incidence of at least seventy degrees when the source of light is of small size and a lesser angle when the source of light is large, the profile of these flutings being calculated according to the law of the cosine of the angle of emission in order to render uniform the apparent intrinsic brilliancy as herein described and set forth.

36. A lamp globe or shade having a series of external horizontal flutings, the profile of which consists of refracting and reflecting faces, said faces having every portion thereof removed that could reflect the rays totally or partially in directions that will cause them to remain in the glass instead of passing directly outward, and having refracting portions between every two reflecting-faces in order that the rays may pass out freely through the said refracting-faces, without encountering any other prisms, as herein described and set forth.

37. A lamp globe or shade provided on its internal surfaces with a series of flutes having concave or concavo-convex profiles whose maximum angle of incidence does not exceed seventy degrees in order to reduce the resulting angle of incidence on the external surfaces as herein described and set forth.

38. A lamp-globe constructed with a series of exterior horizontal prisms, the prisms upon the upper part of the globe forming a reflector which reflects its light interiorly, and those below refracting, substantially as described.

In testimony whereof we affix our signatures in presence of two witnesses.

ANDRÉ BLONDEL.
SPIRIDION PSAROUDAKI.

Witnesses:
CLYDE SHROPSHIRE,
G. DE MESTRAL.